United States Patent [19]

Paull et al.

[11] 4,014,982
[45] Mar. 29, 1977

[54] COMBINED PROCESS FOR UPGRADING SPENT ALKYLATION ACID AND REDUCING NOXIOUS GAS CONTENT OF WASTE GASEOUS STREAMS

[75] Inventors: Peter L. Paull, Weston, Conn.; James M. Caffrey, Jr., Wappingers Falls, N.Y.

[73] Assignee: Texaco Development Corporation, New York, N.Y.

[22] Filed: June 30, 1975

[21] Appl. No.: 591,745

[52] U.S. Cl. .............................. 423/528; 423/235; 423/242; 423/523; 423/540; 423/570

[51] Int. Cl.² ........................................ C01B 17/72

[58] Field of Search .......... 423/235, 523, 540, 570, 423/525, 528

[56] References Cited

UNITED STATES PATENTS

| 1,420,477 | 6/1922 | Fairlie | 423/235 |
|---|---|---|---|
| 2,080,360 | 5/1937 | Lepsoe | 423/570 |
| 2,090,828 | 8/1937 | Beckman | 423/570 |
| 2,325,066 | 1/1943 | Marcotte | 423/235 |
| 2,390,316 | 12/1945 | Mottern | 423/523 |
| 2,789,035 | 4/1957 | Hurlburt | 423/540 |
| 2,955,920 | 10/1960 | Belchetz | 423/523 |
| 3,682,593 | 8/1972 | Browder | 423/523 |
| 3,888,970 | 6/1975 | Haas et al. | 423/570 |

FOREIGN PATENTS OR APPLICATIONS

| 301,232 | 11/1928 | United Kingdom | 423/523 |
|---|---|---|---|
| 413,828 | 7/1934 | United Kingdom | 423/235 |

*Primary Examiner*—Oscar R. Vertiz
*Assistant Examiner*—Eugene T. Wheelock
*Attorney, Agent, or Firm*—T. H. Whaley; C. G. Ries; Robert A. Kulason

[57] ABSTRACT

The effluent streams from utility stack gases containing nitric oxides and sulfur dioxide are sequentially oxidized, absorbed with effluent spent alkylation acid, the unabsorbed remaining gases contacted with carbon monoxide from alkylation units in refinery cracking and other industrial plants to form sulfur, carbon dioxide and nitrogen, the carbon dioxide and nitrogen being vented, the sulfur oxidized to sulfur trioxide and contacting aqueous sulfuric acid therewith to effect concentration of said acid and suitability for recycle to an alkylation unit; the absorbate containing spent alkylation acid sequentially treated with a burning, oxidation, aqueous dilution and carbon monoxide treatment steps to form sulfuric acid for recycle to an alkylation unit and venting formed carbon dioxide and nitrogen.

18 Claims, 1 Drawing Figure

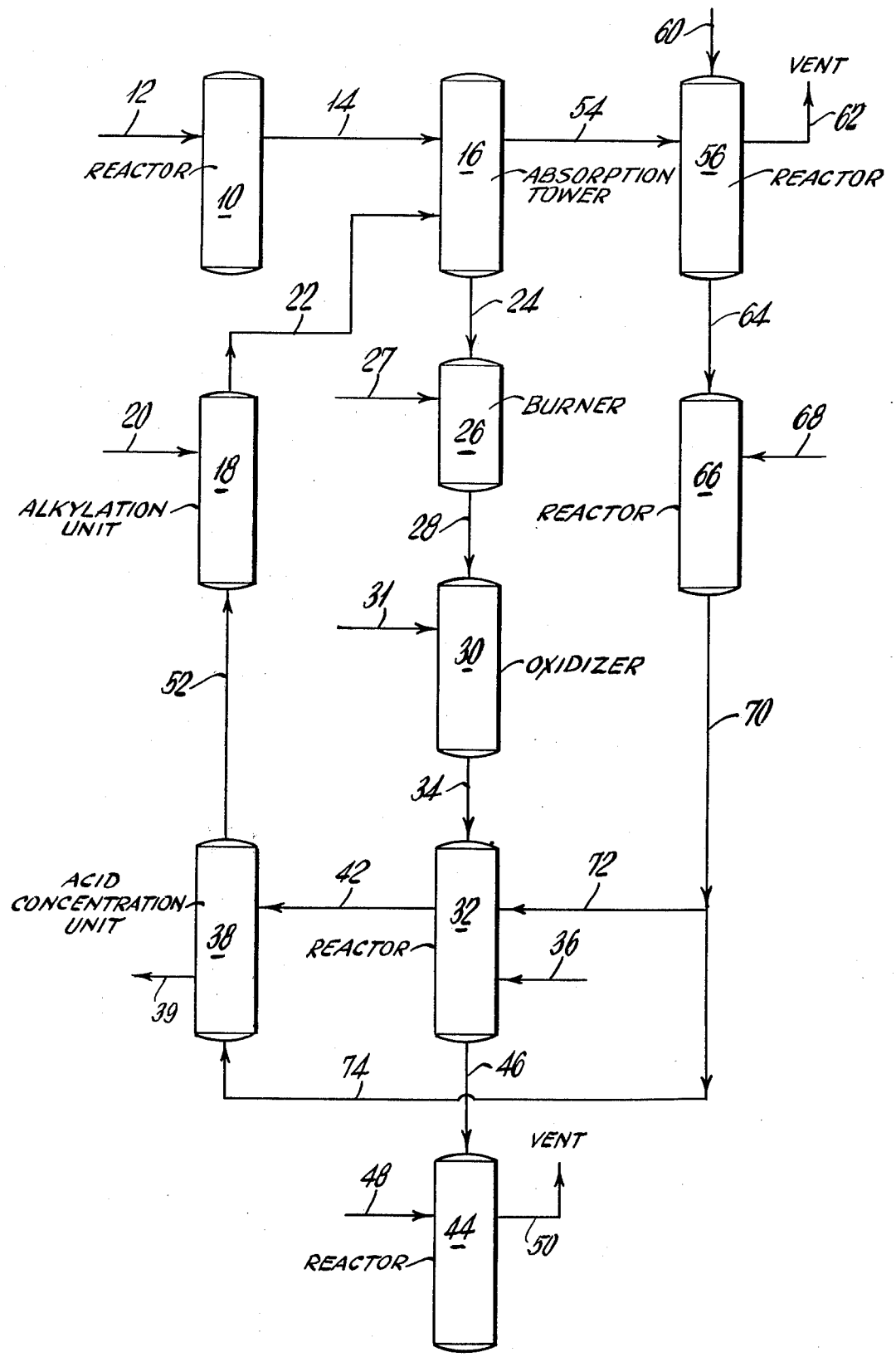

COMBINED PROCESS FOR UPGRADING SPENT ALKYLATION ACID AND REDUCING NOXIOUS GAS CONTENT OF WASTE GASEOUS STREAMS

BACKGROUND OF INVENTION

The acid alkylation of isoparaffins with olefins, such illustratively as propylene, butylenes, amylenes and the like, by charging to a standard commercial alkylation production unit selected olefins, isobutane, in great excess of the olefins, and strong sulfuric acid, wherein the charge of $H_2SO_4$ is present in a weight percent concentration of 98.0 to 99.5, is well-known and widely used commercially. The reaction proceeds at about 30° to 50° F. and the reaction mixture is withdrawn from the reactor and separated into an acid phase and a hydrocarbon phase. Most of the acid phase is recycled to the reactor but the strong sulfuric acid used as a catalyst in the alkylation of the isobutane with aliphatic olefins gradually becomes contaminated with water, polymeric hydrocarbons and sulfate esters. As a consequence, the titratable acidity of the sulfuric acid catalyst drops from its original value so that to maintain the acid in the reaction system at the elevated concentration required for efficient catalysis, it becomes necessary to withdraw catalyst acid from the alkylation system at a rate sufficient to maintain the titratable acidity of the remaining acid in the system at a concentration by weight of about 85 to 92 wt. % and usually about 90 wt. %. This weight of withdrawal usually amounts to about 0.3 pound to 1.0 pound per gallon of alkylated produced. This withdrawn acid, characterized further in the description appearing hereinafter, is referred to as "used" or "spent alkylation acid" or briefly as "spent acid."

The composition of withdrawn spent alkylation acid does not vary appreciably with the olefin used, but the amount of spent acid recovered varies appreciably. In general the hydrocarbon content increases with decreasing titratable acidity.

While the amount of spent acid withdrawn is small on a unit weight basis, the quantities produced by commercial refinery facilities are large, and if not recovered lead to substantial emissions of noxious effluent to the surrounding atmosphere. One method of reducing these emissions by recovery of the used or spent acid is described, illustratively, in U.S. Pat. No. 3,773,917.

Also present, however, in petroleum refining complexes are fluid catalytic cracking regenerator systems yielding gases containing significant quantities, in the volumes produced, of carbon monoxide. Substantial amounts of carbon monoxide are also produced inter alia by separating carbon monoxide from synthesis gas, using a copper liquor absorbent, and from smelting operations.

At the same time and in operative proximity, for the purpose of the present invention, to refinery facilities including cracking, synthesis and alkylation units such as the foregoing, and smelting operations or the like are often disposed utility plant facilities engaged in the production of energy using fossil fuels, particularly high sulfur petroleum residual fuels or coal, the effluent from which, as normally evidenced by the stack gases emanating from these facilities, contain noxious amounts and concentrations of sulfur dioxide and nitrogen oxides.

Efforts made to remove sulfur dioxide have involved heretofore, in one manifestation, the employment of basic aqueous solutions and slurries which tend to leave significant concentrations of $SO_2$ behind which then appear in the stack or flue gases, particularly where high sulfur residual petroleum fuels or coal are employed. However, unless complete removal of $SO_2$ is effected, groundlevel concentrations of this pollutant will occur which may be only slightly better than those resulting from untreated flue gases.

The Tyco process has provided another means for removal of $SO_2$, and nitrogen oxides (NxOy) from stack gases, utilizing a modification of the chamber process, now obsolescent, wherein nitrosyl sulfuric acid ($HNSO_5$) is derived by the following reaction sequence:

$$SO_2 + H_2O + NO_2 \rightarrow H_2SO_4 + NO \qquad (1)$$

$$2NO + O_2 \rightarrow 2NO_2 \qquad (2)$$

$$NO + NO_2 + 2H_2SO_4 \rightarrow 2HNSO_5 + H_2O \qquad (3)$$

In these reactions $NO_2$ acts as a homogeneous catalyst; and whereas steps (1) and (2) occur simultaneously in the conventional chamber reaction they are undertaken separately in the Tyco process. It was found advantageous to have these reactions performed separately since reaction (1) occurs much more rapidly than reaction (2). Thus, in the Tyco process this reaction (2) is carried out separately after stripping an equimolar mixture of nitric oxide and nitrogen dioxide (or $N_2O_3$) from the nitrosyl sulfuric acid and cooling it. The excess $NO_2$ is converted to nitric acid in the typical Tyco process.

In the original embodiment of the Tyco process, $NO_2$ is introduced into flue gas to provide the reactant mixture of reaction (1) at 300° F. with consequent and complete oxidation of $SO_2$ in 5 seconds. Excess nitrogen oxides provide an oxidation level corresponding to $N_2O_3$.

In this original or baseline process the reaction gas is countercurrently contacted with $H_2SO_4$ of 80 wt. % concentration at 80° F. Gas from the absorber goes to the stack. The scrubber exit liquid is nitrosyl sulfuric acid dissolved in 76 wt. % $H_2SO_4$ at about 275° F. It is reconstituted to 80 wt. % sulfuric acid at 395° F. by hot combustion gas. Air oxidation converts the nitrogen oxides to $NO_2$ in a re-oxidation chamber, and part is removed as nitric acid. The remainder is introduced into flue gas. The latter is newly treated in conjunction with this recycled remainder.

One modification of this initial embodiment involves the use of cooling to separate water upstream of the absorber, but this too was deemed unattractive commercially.

A further modification is similar to that of the original process up to the absorption step. Absorption is however, undertaken at an elevated temperature, i.e. about 250° F. and $N_2O_3$ is, as a result, recovered without condensation of water also present normally in the combustion or stack gases being treated. A solution of nitrosyl sulfuric acid in 80 wt. % acid concentration is filtered in this modification and passed to a catalytic reactor packed with charcoal, and is then passed countercurrently to air that strips and oxidizes the nitrogen oxides. Part of the $NO_2$ is absorbed as $HNO_3$ as in the earlier modifications, and the remainder also recycled as previously described.

The Tyco process thus involves basically a reliance on the recycling of nitrogen oxides to react with the effluent sulfur dioxide and water of reaction (1).

Indeed, conventionally as seen, the process requires the incorporation of nitric acid into reaction (1), a factor which tends to detract from the economic viability of the Tyco process.

Additionally, the Tyco process is not adapted to treat both flue gases and spent alkylation acid nor is it capable of accomplishing its espoused purpose in a single pass through, as indicated. Significantly, too, this process is capable normally of generating only dilute levels of sulfuric acid, rather than concentrated acid and immediately useful, more readily shipped products, such as sulfur.

Various other experimental processes have also been developed for recovery of one or more of the other pollutants referred to herein above, that is, carbon monoxide, nitrogen oxides, and the like.

If, accordingly, the pollutants incorporated in flue gases and refinery effluent emission from power plants utilizing fossil fuels; from petroleum refinery operations and additionally, metallic ore smelters as well as other petroleum product sources, could be mutually entrained and subjected in large volume to an efficient process of absorption, separation and reaction in which the several pollutants were utilized to aid in recovery of significant industrial chemicals and the formation of innocuous effluent which could be let free in the surrounding atmosphere without significant concern for its pollutant effect, and without the required recycling of impurities, a valuable and economic method would be effected which would constitute a significant advance in the state of the art.

SUMMARY OF INVENTION

It is, therefore, a primary object of this invention to provide a novel method whereby the more noxious industrial effluents are utilized to produce industrially usable products and innocuous compositions that may be vented to the surrounding atmosphere without a material increase in the concentration of undesirable pollutants therein.

A further object of the invention is to provide a method for forming and regenerating from an admixture of noxious waste material marketable amounts of sulfur and, in addition, sulfuric acid of a concentration sufficient to function effectively as an alkylation catalyst while passing off into the atmosphere only such innocuous materials as carbon dioxide and nitrogen, some moisture, and mixtures thereof.

It is an additional object of this invention to provide a method for forming innocuous effluent and useful industrial chemicals which can process large volumes of spent alkylation acid and noxious industrial effluent efficiently without recycling the impurities or requiring the addition to the process of useful industrial chemicals not inherent in the process.

Accordingly, it has now been discovered that concentrated sulfuric acid, sulfur, nitrogen and carbon dioxide, nitrogen oxide, carbon monoxide and spent alkylation acid, the foregoing material being received as effluent from available refinery cracking and copper liquor absorbent units, alkylation plants, smelting facilities, power plants and the like. The method has particular application as a continuous process.

BRIEF DESCRIPTION OF THE DRAWING

The FIGURE is a diagrammatic illustration of the method according to the invention.

DESCRIPTION OF THE PREFERRED EMBODIMENTS

The process of the present invention comprises initially contacting the hot emergent flue gases incorporating nitrogen oxides (and including some nitrogen dioxide), sulfur dioxide, oxygen and water with an oxidation catalyst and most desirably a "Leak alumina catalyst." This latter term is meant to encompass those catalytic structures comprising a substrate, for example, a metal mesh or metal wool, providing structural stability and broadly exposed surface, although not restricted in configuration or to use of any particular material, having an adherent film or layer of alumina, such as monohydrate alumina or preferably and predominantly gamma or eta alumina; and as the oxidation catalyst, a metallic oxide including complexes thereof, wherein the metal is one selected from Groups Ia, Va, VIa, VIIa, VIII of the Periodic Table, (set forth on the back cover page of the text "Advanced Inorganic Chemistry" by F. Albert Cotten and G. Wilkinson) or vanadium oxides and combinations thereof; illustratively and preferably the metal oxides thereof including vanadium oxides, and most desirably vanadium pentoxide; copper oxide and complexes thereof with, for example, copper chromite; chromium oxides; molybdenum oxides; tungsten oxides; manganese oxides; iron oxides; cobalt oxides; nickel oxides; and mixtures or other complexes thereof. Acceptable Leak alumina catalysts for use herein are further described in U.S. Pat. Nos. 3,231,520; 3,240,698; and 3,362,783. This initial contact of flue gases or the like with the foregoing Leak alumina oxidation catalyst is effected at an elevated temperature which while not narrowly critical is preferably within the range generally of about 300° to 350° F. The oxidation catalyst serves to convert substantially all of the nitrogen oxides into nitrogen dioxide. A portion of the sulfur dioxide present may also be converted into sulfur trioxide at this time.

The flue gases or other noxious effluent of similar composition so modified, are next contacted with spent alkylation acid preferably by countercurrent contact one with the other at a temperature within the range of about 235° to 350° F., preferably about 250° F. Substantial amounts of the sulfur dioxide and nitrogen oxides, including substantially all of the sulfur trioxide, present are absorbed in the spent alkylation acid.

The unabsorbed flue gases containing the remainder of the sulfur dioxide are intermixed with a stream of carbon monoxide recovered normally from synthesis gas using a copper liquor absorbent; smelting operations as indicated hereinabove; or from other industrial waste fluids; and passed through a reactor also containing an oxidation catalyst, and preferably a Leak alumina catalyst, such as described hereinabove at a temperature within the range of about 300° to 450° F., and preferably about 325° F. The Leak alumina catalyst is, in the latter instance, preferably a copper oxide-copper chromite complex. The products resulting from the reaction so induced are sulfur, carbon dioxide, nitrogen and steam ($H_2O$). The carbon dioxide, nitrogen and water are vented harmlessly into the surrounding environment and the sulfur recovered is marketable as such or used in a subsequent phase of the instant process as described in detail hereinafter.

The free sulfuric acid present in the spent alkylation acid together with the nitrogen oxide, predominately NO together with some $NO_2$, also present, react to yield nitrosyl sulfuric acid. The spent alkylation acid incorporating nitrosyl sulfuric acid, the free sulfuric acid remaining in the spent alkylation acid, and any sulfur trioxide present, and absorbed sulfur dioxide as well as water and hydrocarbon components are first burned to reduce water and hydrocarbon components and increase the sulfuric acid content by conversion of the latter initially to sulfur dioxide. This modified spent alkylation acid composition is then catalytically oxidized with oxygen so that the contained sulfur dioxide is converted to sulfur trioxide, nitrogen oxides and carbon dioxide with sufficient water added thereafter to form in the sequential acid reconstitution step, sulfuric acid of about 70 wt. % concentration.

The catalyst employed in the oxidation step is again desirably a Leak alumina catalyst, although the oxidizing agents such, for example, as vanadium pentoxide, cupric oxide or other metal oxide, the metal of which is selected from Groups I, VI, VII or VIII of the Periodic Table, or complexes thereof, such as described hereinabove, may also be disposed on a conventional substrate, such illustratively, as an activated carbon absorbent. The regenerated sulfuric acid is thereafter separated from the nitrogen oxides and carbon dioxide gases in a concentration of about 70 wt. % and concentrated to at least 98 wt. % $H_2SO_4$. If desired fuming sulfuric acid can be secured by incorporation of a molar excess of $SO_3$ in the acid concentration step. The concentrated sulfuric acid so recovered is conveniently employed in the alkylation unit from which the spent alkylation acid was originally evolved or another such unit, as desired. The nitrogen dioxide and carbon monoxide are simultaneously, but separately from the foregoing acid concentrated, reacted with additional amounts of the undesired industrial effluent, carbon monoxide, to form nitrogen and carbon dioxide which, in accordance with a preferred embodiment of the present invention, are free of particulate matter when formed, and freely vented to the atmosphere without ill effect.

The term, "nitrogen oxides" or "nitric oxides" as employed herein is intended to encompass compounds of the general formula, $N_xO_y$, referred to herein above, where $x$ is an integer of from 1 to 2 and $y$ is an integer having a value at least that of $x$ and within the range of 1 to 4 inclusive. Illustrative of the nitrogen oxides present in flue gases and other effluent sources treated by the present process are NO, $NO_2$, $N_2O_2$, $N_2O_3$ and $N_2O_4$.

Typically, the flue gas generated for the process of the invention where derived from a coal which contains, illustratively, the following weight percentages of the indicated components: carbon: 70.1; oxygen: 6.6; hydrogen: 4.9; nitrogen: 1.4; sulfur: 30.0; ash: 12.7 and moisture: 1.3. Where derived from a residual oil up to 5 wt. % sulfur; 85 wt. % carbon; and 10 wt. % hydrogen are present. The sulfur content of the coal or residual oil burns to about 98 wt. % sulfur dioxide and about 2 wt. % sulfur trioxide. The flue gas containing these oxides should most desirably be free of any ash content for the most efficient operation of the instant process and this is accomplished conveniently using coventional treatment means such as an electrostatic precipitator well-known to those skilled in the relevant art. Normally, according to these known methods, the ash is removed from the flue gas prior to oxidation of the nitrogen oxides. Normally, the flue gas will contain 0.3 to 2.0 wt. % sulfur dioxide and 0.05 to 0.5 wt. % nitrogen oxides. The nitrogen oxides result from the combustion process and any nitrogen compounds in the fuel. The terms "percentages" and "parts" and their grammatical equivalents as employed herein refer to percentages and parts by weight unless otherwise expressly indicated.

The composition of the spent alkylation acid introduced into the foregoing absorber where it is contacted with nitrogen dioxide and sulfur dioxide will vary somewhat depending on reaction conditions. spent alkylation acid usually contains about 3 wt. % to 5 wt. % of water and 3 to 8 wt. % of polymeric oils. Spent acid freshly discharged from an alkylation unit may also contain up to about 0.5 wt. % and in some instances even as high as 3.0 wt. %, of alkyl sulfates. The remainder is present substantially as free sulfuric acid. As is evident, this acid is present in a concentration by weight of the total of spent acid of about 92 to about 84 wt. %. Where propylene is used as the olefin charge stock in the alkylation unit, the isoalkyl sulfate where present is isopropyl acid sulfate. The so-called polymeric oils are organic sulfates, acid derivatives of the reactants, such as tert. butyl sulfonic acid, and oligomers of the olefin.

Carbon monoxide from the waste fluid sources recited hereinabove, is introduced, in large concentrations, into the process of the invention separately and in succeeding steps as described in detail hereinafter.

The deployment of these industrial waste fluids and the procedure whereby useful end-products are derived therefrom or dispersed as harmless and naturally occurring components in the surrounding atmosphere is shown by reference to the preferred embodiment appearing in the flow diagram of the accompanying FIGURE. The apparatus forming the individually enumerated units referred to therein are standard and well-known to those skilled in the art to which this invention pertains.

Thus, as noted generally heretofore, the flue gases, which are employed by way of illustration in the description that follows leave the power plant or equivalent source at a temperature normally of about 900° F. These emergent gases are then preferably first passed through an electrostatic precipitator (not shown) where virtually all of the fly ash is removed so as to avoid contamination, and resulting diminution in effectiveness, of the catalyst bed employed in the catalyst oxidizer 10 of the succeeding step. The flue gas, illustratively, is conducted to the catalytic oxidizer 10 from the precipitator through line 12. The flue gas is a mixture, normally, of sulfur dioxide, nitrogen dioxide and nitric oxide together with nitrogen, carbon dioxide, water and oxygen. The catalytic oxidizer containing a Leak alumina catalyst disposed on a substrate of expanded surface dimensions, as described above, serves to convert substantially all of the nitrogen oxide content of the gas stream into nitrogen dioxide and a portion of the sulfur dioxide into sulfur trioxide. In practice, this passage through, and the conversion of flue gas in, the catalytic oxidizer is conducted at about 300 to 350° F. and preferably at about 300° F.

The flue gas, so modified, is then transmitted by duct 14 to the absorption tower 16 wherein the flue gas is passed countercurrently through the spent alkylation acid introduced into the process at this point.

While the temperature of the flue gas is not narrowly critical at its point of entry into the catalytic oxidizer 10, the gas should, and normally does, enter the absorber 16 at a temperature above its dew point to reduce corrosion of the absorber structure. The temperature of the hot flue gases is appreciably reduced in the absorber desirably to within the range of 225° to 350° F. by contact with the spent alkylation acid, the temperature of which is in turn elevated.

The spent alkylation acid is, as noted, that recovered illustratively, from one or more standard commercial sulfuric acid alkylation units 18 wherein the alkylation reaction is carried out at about 30° to 50° F. with efficient mixing. The reaction mixture is withdrawn from the reactor and separated into an acid phase and a hydrocarbon phase. The nitrogen dioxide, carbon dioxide and a portion of the sulfur dioxide present in the flue gas are absorbed in the spent alkylation acid also containing some sulfur dioxide and water. The sulfur dioxide and nitrogen dioxide absorbed from the flue gas are converted in part to sulfuric acid by the nitrogen dioxide with concomitant conversion of the nitrogen dioxide to nitric oxide. Some nitrogen dioxide will react with the olefinic portion of the spent alkylation acid. There is formed, in turn, by reaction of the unconverted nitrogen dioxide and nitric oxide with the sulfur dioxide and water content formed, and already present in, the spent alkylation acid, nitrosyl sulfuric acid in the manner defined generally in equations (1) and (3) hereinabove. Any $SO_3$ in the flue gas, after it leaves the oxidizing unit 10 is also normally absorbed in the spent alkylation acid and converted to sulfuric acid as well upon reaction with the water content of the latter composition.

The spent alkylation acid incorporating the foregoing absorption and reaction products is removed from the absorber 16 through the conduit 24 and passed to the burner or combustion chamber 26 where, in the present of oxygen obtained by the introduction of air through inlet 27, the spent alkylation acid is burned with consequent reduction of its water and hydrocarbon contents and conversion of the sulfuric acid present in substantial quantities to $SO_2$.

The combustion chamber 26 is a standard sludge conversion unit wherein the temperature is maintained at approximately 1800° to 2000° F. If the acid is too low in combustibles, fuel gas is added to supply the additional heat required to maintain the temperature at 1800° to 2000° F. If the acid is high in combustibles, no fuel gas need be added, but instead, water may be required in addition to that present in the reaction mixture introduced into the chamber from the absorber 16 in order to remove any excess heat released above that required to maintain the temperature at 1800° to 2000° F. Thus, in the case of spent alkylation acid that is relatively low in hydrocarbon content, the addition of fuel gas is normally required.

As a result of this process step, carbon dioxide and water are also formed in the newly formed reaction product mixture which will include small amounts of dilute sulfuric acid. This mixture is then transferred by line 28 to the catalytic oxidation unit 30 wherein is disposed a suitable catalyst system such as the Leak alumina catalyst system described hereinabove or a catalyst system composed of an adsorbent such as active carbon, meerschaum, or aluminum silicate, impregnated with a catalyst such as iodine, copper, gold, platinum, titanium, iron, zinc, nickel cobalt, tin, arsenic, chromium, vanadium, or molybdenum added either as the element or in the form of an oxide or ionizable salt, such, for example and preferably, as vanadium pentoxide. Air, to supply oxygen, is introduced to the unit 30 by means of the inlet 31.

The impregnated adsorbent may be used as fixed bed, which is bathed by the small amounts of dilute sulfuric acid present in the reaction mixture entering unit 30. The reaction temperature of the unit is maintained at 90° to 160° F. The $SO_2$ carried over from the burner or combustion chamber 26 is converted substantially completely to $SO_3$. This low temperature conversion of $SO_2$ to $SO_3$ is further described, illustratively, in British Pat. No. 994,070.

Accompanied by the other components of the reaction mixture, the $SO_3$ is passed to the acid reconstitution vessel 32 by means of the conduit 34. Water is introduced into the reaction mixture in this latter vessel 32 through the inlet 36 inducing the regeneration of sulfuric acid as represented in the following equation (4):

$$H_2O + SO_3 \rightarrow H_2SO_4 \qquad (4)$$

Excess water is desirably introduced into the reactor 32 to react with $SO_3$ generated, illustratively, by oxidation of elemental sulfur prepared from a source independent of the present process or most desirably and indeed in a significantly preferred embodiment from the recovered unabsorbed flue gas leaving the absorber 16 as described in detail hereinafter and introduced into the unit 32 through the feed line 72. The resulting product is additional $H_2SO_4$ increasing the concentration of acid in the acid reconstitution unit 32 prior to its transmission to the acid concentration unit 38. The sulfuric acid, with or without the introduction of $SO_3$ and additional water into the acid reconstitution reactor 32, will, upon the occasion of its departure therefrom, exist in an aqueous phase in a concentration of at least 70 wt. %. Sulfur trioxide, also derived, most desirably, from the unabsorbed flue gas is passed into the acid concentration unit 38 operated at between about 200° and 460° F. in a preferred embodiment through the feed line 74 simultaneously with the entry of the relatively dilute sulfuric acid from the acid reconstitution unit 32 through the duct 42.

The offgases composed substantially of nitrogen dioxide and carbon dioxide, the latter formed in the burner 26, as well as some steam are then conveyed to the conversion chamber 44 through the overhead line 46. To this latter chamber is also conveyed effluent carbon monoxide secured, typically, from the cracking unit of a refinery or as industrial waste fluid from another appropriate source such as described elsewhere herein, and introduced into the chamber 44 through the inlet 48. The nitrogen oxides are reduced in contact with the carbon monoxide to form nitrogen and the carbon monoxide converted to carbon dioxide and these resulting products harmlessly released to the surrounding atmosphere through the vent 50. This reaction is conveniently undertaken at about 300° to 450° F. using standard procedures well-known to those skilled in the art.

That portion of the flue gas not absorbed by the spent alkylation acid is recovered as an offgas from the absorber tower 16 and is conducted through the line 54 to the offgas catalytic reactor 56. This gas, containing normally about 56.5 wt.% of the $SO_2$ present in the flue gas initially received as effluent and unabsorbed in the tower 16, as well as steam is contacted, together with recovered carbon monoxide containing effluent introduced by the inlet 60 from an appropriate source as described hereinabove, at a temperature of about 300° to 450° F., and most desirably about 325° F., with a Leak alumina catalyst such as described with respect to the initial catalytic reactor 10, that is, illustratively, a copper, nickel or cobalt oxide disposed on alumina which in turn is coated onto a stainless steel wool, or other suitable support. Water as steam and carbon dioxide are emitted from the reactor 56 harmlessly into the surrounding atmosphere by means of vent 62; and sulfur is recovered as a result of the reaction reflected by the following reaction equation (5):

$$2CO + SO_2 \rightarrow 2CO_2 + \tfrac{1}{2}S_2 \tag{5}$$

The reduced sulfur is either transferred to storage or, as shown in the drawing, is transmitted by the duct 64 to the catalytic oxidizer 66 to which air, or other oxygen supply, is also connected by means of the inlet duct 68. The sulfur is brought into contact with oxygen therein at a temperature of 300° to 600° F. and preferably about 325° F. over a Leak alumina catalyst bed disposed as described with respect to the initial such unit 10. Other conventional catalyst systems, for example, vanadium pentoxide or another such standard oxidation catalyst disposed on activated carbon or other generally accepted support can also be used. The product, sulfur trioxide, is then introduced selectively through the conduit 70 into the feed lines 72 and 74 for delivery to the acid reconstitution and acid concentration units 32 and 38 respectively as required to effect the production of the desired concentrated sulfuric acid.

The reconstituted sulfuric acid after concentration to about 98.0 to 99.5 wt. % $H_2SO_4$ in the acid concentration unit 38 is then in accordance with a preferred embodiment of the invention transmitted to the alkylation unit 18 through the feed line 52 for utilization therein. It may of course be fed to one or more other alkylation units in a similar feed mechanism, if desired.

This delivery technique can also be used to provide fuming sulfuric acid, and the acid product secured in either event, utilized for a variety of purposes. The spent alkylation acid can also be derived by a modification of design obvious to those skilled in the art to which this invention pertains to accomodate a feed to the absorber 16, in implementing the practice of the invention, from a number of such alkylation units.

The present invention is further illustrated by the following Example:

EXAMPLE

This example illustrates the practice of a continuous process, according to the present invention and employing the apparatus referred to in the accompanying FIGURE.

An emergent flue gas having a temperature of about 900° F. from a power plant unit is first passed through an elelctrostatic precipitator in which substantially all of the fly ash present is removed. The flue gas is then introduced into a catalytic oxidizer and at this point has a temperature of about 300° F. and a composition including the components and amounts thereof recited in Table I as follows:

TABLE I

| Component | Pounds moles per hour (lb. mole/hr.) |
|---|---|
| $SO_2$ | 367 |
| $NO$ | 192 |
| $NO_2$ | 4 |
| $O_2$ | 7046 |
| $H_2O$ | 15494 |

The catalyst system positioned in conventional manner in the catalytic oxidizer 10 and with which the foregoing flue gas composition transmitted thereto through line 12 is brought into contact is a Leak alumina catalyst, specifically vanadium pentoxide disposed on an alumina-coated steel wool support. The water of the flue gas remains substantially unaffected by this initial oxidation but substantially all of the nitrogen oxides are converted to nitrogen dioxide utilizing the contained oxygen of the flue gas and some of the sulfur may be converted to sulfur trioxide so that the flue gas as modified and transported through conduit 14 to the absorption tower 16 includes a composition substantially as follows wherein the sulfur trioxide therein is calculated as $SO_2$ for reasons of simplicity:

TABLE II

| Component | Lb. Mole/Hr. |
|---|---|
| $SO_2$ | 367 |
| $NO_2$ | 106 |
| $O_2$ | 6944 |
| $H_2O$ | 15494 |

The absorption tower 16 is of standard construction and provides for countercurrent flow of the modified flue gas and spent alkylation acid transmitted thereto from a standard alkylation unit 18 through the duct 22. The spent alkylation acid amounting, on an equivalent basis, to about 276 lb. /moles/hr. and having a titratable acidity in the range of about 85 to 92 wt. % $H_2SO_4$; polymeric oil content of about 3 to 8 wt. %; 3 to 5 wt. % of water; and 0.5 to 3.9 wt. % of dialkyl sulfates, removes about 43.5 wt. % of the $SO_2$ of the flue gas, 3 wt. % as absorbed $SO_2$ and 40.5 wt. % as $H_2SO_4$ reaction product, in addition, converts substantially, to all of the nitrogen dioxide content to nitric oxide and substantially removes all of the sulfur trioxide formed in the catalytic oxidizer 10. This absorption step proceeds at about 300° F., the flue gas heating the spent acid, and the latter cooling the flue gas. There is recovered as an unabsorbed off-gas from the absorber about 15,494 lb. moles/hr. of water as steam; about 208 lb. moles/hr. of $SO_2$; and 106 lb. moles/hr. of nitric oxide. The modified spent alkylation acid separately recovered includes about 11.4 lb. moles/hr. of $SO_2$; about 147 lbs. moles/hr. of $H_2SO_4$ and 106 lb. moles of $HNSO_5$. The offgas containing sulfur dioxide, nitric oxide and steam exiting separately from the absorber 16 is introduced by the inlet duct 54 into the reactor 56 which is a catalytic reactor similar to that initially described (10) and containing a Leak alumina catalyst using copper oxide on the alumina-coated support. The reaction mixture in this chamber has a temperature of about 300° F. Also introduced by line 60 into this reactor 56 is carbon monoxide effluent from a refinery cracking unit to cause the formation of 208 lb. mole/hr. of sulfur, carbon dioxide, nitrogen and water, as steam; the gas mixture containing, carbon dioxide, nitrogen and water being vented to the atmosphere harmlessly by means of the outlet 62.

The sulfur is then contacted with oxygen in the catalytic oxidizer chamber 66 to which the sulfur is transmitted by conduit 64 and the oxygen (in air) by inlet 68. This chamber 66, also containing the Leak alumina catalyst, is otherwise substantially identical to the catalytic oxidizer 10 of the chamber 10 as well; and serves to convert the sulfur trioxide which is then transported by the feed line 70 to the acid reconstitution chamber 32 and the acid concentration unit 38, where it is employed to provide concentrated sulfuric acid by processes well-known to those skilled in the art to which this invention pertains and which is described further hereinbelow.

The spent alkylation acid modified as described hereinabove in the tower 16 is transmitted by the duct 24 to the combustion chamber 26 where the water and hydrocarbon content are reduced by burning at a temperature of about 1800° to 2000° F. and the sulfuric acid content increased by conversion of the sulfuric acid content and sulfur trioxide to sulfur dioxide. Water or fuel gas is introduced into the chamber as required in order to maintain the desired and stated temperature range.

The product mixture of the burner 26 is transmitted to the oxidation chamber 30 by means of duct 28. Air, to provide oxygen, is supplied to this chamber 30 by means of air inlet 31.

The catalyst employed on a fixed bed of activated carbon in this latter unit 30 is vanadium pentoxide. The reaction temperature of this latter chamber is maintained at 90° to 158° F., and the catalyst impregnated adsorbent is bathed by the small amount of dilute sulfuric acid present in the reaction mixture entering the unit 30. The $SO_2$ recovered from the combustion chamber is converted substantially completely to $SO_3$ by this oxidation step.

Carbon dioxide formed in the burner 26 is also passed into and through the oxidizer 30 with the sulfur dioxide, nitrogen dioxide, $NO_2$ and water and thence into the acid reconstitution unit 32 by means of the duct 34. Water is introduced into the latter unit 32 together with $SO_3$ (from the feed line 72 connected, in turn, to the duct 70 and the catalytic oxidizer 66 in which the recovered sulfur is oxidized). Sulfuric acid of about 70 wt. % concentration results. The exothermic reaction in the reconstitution unit 32 is undertaken using standard means at a temperature of 150° to 250° F.; the reaction vessel 32 being appropriately cooled. The reconstituted sulfuric acid is drawn off into conduit 42 for transmittal to the acid reconcentration unit 38.

Sulfur trioxide is introduced into the reconcentration unit, as well, from the catalytic oxygen chamber 66, being received through the duct 70 and feed line 74. The sulfur trioxide so received in the chamber 38 is reacted therein to further effect concentration of the acid content by reaction with the water content thereof. Excess water is removed by heating of the vessel 38 to a temperature within the range of 212° to 290° F. and is vented through outlet 39. The sulfuric acid formed has a weight concentration of 98 wt. % and is transmitted by means of the duct 52, for use as catalyst, to the alkylation unit 18 from which the spent alkylation acid treated as described hereinabove is originally recovered.

The nitrogen oxides derived from the combination of nitrosyl sulfuric acid and any organic nitrogen compounds and carbon dioxides introduced into the acid reconstitution unit 32 are removed as offgas therefrom by the overhead 46 and passed to the reactor 44. Carbon monoxide recovered from a refinery cracking unit is also introduced into this latter reactor and after passage over the catalytic bed therein contained, the innocuous products, nitrogen and carbon dioxide, are passed off into the atmosphere.

The foregoing process is particularly advantageous in the relatively high rate of speed at which large volumes of industrial waste fluids and spent alkylation acid may be treated. Additionally, in its formation and emission of nitrogen, for example, the instant process treats effluent carbon monoxide while avoiding the necessity of recycling nitrogen oxides to form nitric acid as suggested heretofore. Similarly efficient is the conversion to sulfur of the sulfur dioxide in the unabsorbed industrial waste fluids treated by the process.

It will be evident that the terms and expressions that have been employed herein are used as terms of description and not of limitation. There is no intention in the use of such terms and expressions of excluding equivalents of the features shown and described or portions thereof and it is recognized that various modifications are possible within the scope of the invention claimed.

We claim:
1. In the continuous formation of carbon dioxide, nitrogen and concentrated sulfuric acid from industrial flue gas comprising nitrogen oxides, sulfur dioxide, oxygen, and water and spent alkylation acid including hydrocarbons, water and sulfuric acid, the steps that comprise:
 a. contacting said flue gas with a first oxidation catalyst to effect conversion of the nitrogen oxides to nitrogen dioxide and a portion of said sulfur dioxide to sulfur trioxide,
 b. admixing the oxidized flue gas of step (a) with spent alkylation acid to absorb at least a part of the oxides of sulfur and nitrogen resulting in step (a),
 c. treating the unabsorbed gases from step (b) composed of sulfur dioxide and nitrogen oxides with carbon monoxide in the presence of a second oxidation catalyst to yield nitrogen, carbon dioxide and sulfur and separating said nitrogen and carbon dioxide from said sulfur,
 d. burning said alkylation acid containing absorbed flue gases in the presence of oxygen to reduce hydrocarbon and water content thereof to produce a mixture comprising carbon dioxide, nitrogen oxides and sulfur dioxide,
 e. contacting said mixture resulting from step (d) with a third oxidation catalyst in the presence of oxygen to effect conversion therein of said sulfur dioxide to sulfur trioxide,
 f. combining the sulfur trioxide containing mixture resulting from step (e) with a portion of the sulfur trioxides formed in step (i) with water to form sulfuric acid in the aqueous phase,
 g. separating the sulfuric acid formed in step (f) from unabsorbed nitrogen oxides and carbon dioxide gases of step (f), contacting said unabsorbed carbon dioxide and nitrogen oxides with carbon monoxide in the presence of a fourth oxidation catalyst to form carbon dioxide and nitrogen, h. adding a portion of the sulfur trioxide formed in step (i) to the separated sulfuric acid of step (g) to effect greater concentration thereof, i. oxidizing the sulfur separated in step (c) in the presence of a fifth oxidation catalyst and oxygen to produce sulfur trioxide.

2. A process in accordance with claim 1 wherein said first, second, third, fourth and fifth oxidation catalysts comprise a metal oxide wherein the metal is one selected from Group Ib, VIa, VIIa or VIII of the Periodic Table or oxides of vanadium.

3. A process according to claim 1 wherein said sulfuric acid formed in said step (f) is present in a concentration of about 70 wt. %.

4. A process according to claim 1 wherein said first, second, third, fourth and fifth oxidation catalyst is vanadium pentoxide.

5. A process according to claim 1 wherein said first, second, third, fourth and fifth oxidation catalyst is an oxide of copper.

6. A process according to claim 1 wherein said second oxidation catalyst is copper oxide in complex with copper chromite.

7. A process according to claim 1 wherein said first, second, third, fourth and fifth oxidation catalyst are deposited upon alumina coated on a support structure of extended surface dimension.

8. A process according to claim 1 wherein fly ash present in said industrial flue gas is removed therefrom prior to step (a).

9. A process according to claim 1 wherein step (a) occurs at a temperature in the range of 300° to 350° F.

10. A process according to claim 9 wherein said temperature is about 325° F.

11. A process according to claim 1 wherein step (b) is effected at a temperature of from 235° to 350° F.

12. A process according to claim 11 wherein said step (b) is conducted at a temperature of about 250° F.

13. A process according to claim 1 wherein said treating in step (c) is conducted at a temperature of between about 300° and 450° F.

14. A process according to claim 13 wherein said temperature is about 325° F.

15. A process according to claim 1 wherein said separated sulfuric acid upon concentration from an aqueous phase with introduction of sulfur trioxide in step (h) contains a weight concentration of at least about 98 wt. %.

16. A process according to claim 15 wherein said sulfuric acid is concentrated to 98 to 99.5 wt. %.

17. A process according to claim 1 wherein the concentrated sulfuric acid resulting from step (h) is used as the alkylation catalyst into an alkylation process of isobutene with olefins.

18. A process according to claim 1 wherein said concentration in step (h) occurs at a temperature between about 200° and 460° F.

* * * * *